(12) United States Patent
Sivakumar et al.

(10) Patent No.: US 11,956,141 B2
(45) Date of Patent: Apr. 9, 2024

(54) SERVICE CHAINING WITH PHYSICAL NETWORK FUNCTIONS AND VIRTUALIZED NETWORK FUNCTIONS

(71) Applicant: Juniper Networks, Inc., Sunnyvale, CA (US)

(72) Inventors: Mahesh Sivakumar, Milpitas, CA (US); Anantharamu Suryanarayana, San Jose, CA (US); Ankur Tandon, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/297,291

(22) Filed: Apr. 7, 2023

(65) Prior Publication Data
US 2023/0246941 A1 Aug. 3, 2023

Related U.S. Application Data

(63) Continuation of application No. 17/454,979, filed on Nov. 15, 2021, now Pat. No. 11,652,727, which is a
(Continued)

(51) Int. Cl.
*H04L 45/02* (2022.01)
*H04L 12/46* (2006.01)
*H04L 41/12* (2022.01)

(52) U.S. Cl.
CPC .......... *H04L 45/02* (2013.01); *H04L 12/4641* (2013.01); *H04L 41/12* (2013.01)

(58) Field of Classification Search
CPC ...... H04L 45/02; H04L 12/4641; H04L 41/12
(Continued)

(56) References Cited

U.S. PATENT DOCUMENTS 9,571,394 B1 2/2017 Sivaramakrishnan et al.
9,634,936 B2 4/2017 Bansal et al.
(Continued)

FOREIGN PATENT DOCUMENTS

CN 111355666 A 6/2020
EP 2963866 A1 1/2016
(Continued)

OTHER PUBLICATIONS

Office Action, and translation thereof, from counterpart Chinese Application No. 202011040805.0 dated May 23, 2023, 5 pp.
(Continued)

*Primary Examiner* — Anthony Mejia
(74) *Attorney, Agent, or Firm* — Shumaker & Sieffert, P.A.

(57) ABSTRACT

Techniques are described in which a centralized controller, such as a software defined networking (SDN) controller, constructs a service chain that includes a physical network function (PNF) between a bare metal server (BMS) and a virtual execution element (e.g., virtual machine or container), or in some instances a remote BMS, or vice-versa. In accordance with the techniques disclosed herein, the controller may construct an inter-network service chain that includes PNFs, or a combination of PNFs and virtualized network functions (VNFs). The controller may construct an inter-network service chain to steer traffic between a BMS and a virtual execution element or remote BMS through an inter-network service chain using Virtual Extensible Local Area Network (VXLAN) as an underlying transport technology through the service chain.

20 Claims, 6 Drawing Sheets

Related U.S. Application Data continuation of application No. 16/922,954, filed on Jul. 7, 2020, now Pat. No. 11,178,041.

(58) Field of Classification Search
USPC .......................................................... 370/254
See application file for complete search history.

(56) References Cited

U.S. PATENT DOCUMENTS

| | | | |
|---|---|---|---|
| 9,948,553 B2* | 4/2018 | Kwak | H04L 45/02 |
| 10,355,930 B2* | 7/2019 | Wanser | H04L 41/40 |
| 10,476,795 B2* | 11/2019 | Huang | H04L 61/2592 |
| 10,855,588 B2 | 12/2020 | Sarva et al. | |
| 11,178,041 B1 | 12/2021 | Sivakumar et al. | |
| 2015/0010002 A1* | 1/2015 | Duda | H04L 45/745 370/392 |
| 2015/0127701 A1* | 5/2015 | Chu | H04L 69/22 709/201 |
| 2015/0180773 A1* | 6/2015 | DeCusatis | H04L 45/74 370/392 |
| 2015/0358232 A1* | 12/2015 | Chen | H04L 12/4641 370/392 |
| 2016/0337193 A1* | 11/2016 | Rao | H04L 67/63 |
| 2017/0207992 A1* | 7/2017 | Huang | H04L 12/6418 |
| 2017/0257306 A1* | 9/2017 | Huang | H04L 45/64 |
| 2017/0317850 A1* | 11/2017 | Huang | H04L 12/4633 |
| 2018/0013687 A1* | 1/2018 | Jin | H04L 47/36 |
| 2018/0219773 A1* | 8/2018 | Li | H04L 12/4633 |
| 2018/0302343 A1 | 10/2018 | Lokman et al. | |
| 2019/0036845 A1* | 1/2019 | Gong | H04L 43/062 |
| 2019/0222511 A1* | 7/2019 | Lokman | H04L 45/586 |
| 2020/0259741 A1* | 8/2020 | Park | H04L 7/0041 |
| 2020/0382420 A1* | 12/2020 | Suryanarayana | H04L 12/4633 |
| 2021/0092057 A1* | 3/2021 | Devireddy | H04L 45/54 |
| 2022/0070081 A1 | 3/2022 | Sivakumar et al. | |

FOREIGN PATENT DOCUMENTS

| | | |
|---|---|---|
| EP | 3672169 A1 | 6/2020 |
| WO | 2013184846 A1 | 12/2013 |

OTHER PUBLICATIONS

Second Office Action from counterpart Chinese Application No. 202011040805.0 dated Dec. 23, 2022, 5 pp.

Extended Search Report from counterpart European Application No. 20198685.8, dated Feb. 15, 2021, 9 pp.

First Office Action and Search Report, and translation thereof, from counterpart Chinese Application No. 202011040805.0 dated Jun. 13, 2022, 10 pp.

Prosecution History from U.S. Appl. No. 16/922,954, dated Aug. 11, 2021 through Oct. 15, 2021, 22 pp.

Prosecution History from U.S. Appl. No. 17/454,979, dated Sep. 9, 2022 through Mar. 31, 2023, 32 pp.

Response to Extended Search Report dated Feb. 15, 2021, from counterpart European Application No. 20198685.8 filed Jul. 11, 2022, 30 pp.

* cited by examiner

SERVICE CHAINING WITH PHYSICAL NETWORK FUNCTIONS AND VIRTUALIZED NETWORK FUNCTIONS

CROSS REFERENCE

This application is a continuation of U.S. patent application Ser. No. 17/454,979, filed on Nov. 15, 2021, which is a continuation of U.S. patent application Ser. No. 16/922,954, filed on Jul. 7, 2020 (now U.S. Pat. No. 11,178,041, issued on Nov. 16, 2021), which are hereby incorporated by reference herein in their entirety.

TECHNICAL FIELD

This disclosure generally relates to computer networks and, more specifically, to applying network services to network traffic traversing computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

A network operator may deploy one or more network devices to implement service points that apply network functions such as firewall, carrier grade network address translation (CG-NAT), performance enhancement proxies for video, transport control protocol (TCP) optimization and header enrichment, caching, and load balancing. In addition, the network operator may configure service chains that each identify a set of the network functions to be applied to packet flows mapped to the respective service chains. A service chain, in other words, defines one or more network functions to be applied in a particular order to provide a composite network service for application to packet flows bound to the service chain.

SUMMARY

In general, techniques are described in which a centralized controller, such as a software defined networking (SDN) controller, constructs a service chain that includes a physical network function (PNF) between a bare metal server (BMS) and a virtual execution element (e.g., virtual machine or container), or in some instances a remote BMS, or vice-versa. In accordance with the techniques disclosed herein, the controller may construct an inter-network service chain that includes PNFs, or a combination of PNFs and virtualized network functions (VNFs). The controller may construct an inter-network service chain to steer traffic between a BMS and a virtual execution element or remote BMS through an inter-network service chain using Virtual Extensible Local Area Network (VXLAN) as an underlying transport technology through the service chain.

In current systems, PNFs may not be configured as part of a service chain. Instead, a service chain may be limited to including VNFs. In such systems, when network traffic enters a service chain from a source network, Multiprotocol Label Switching (MPLS) is used to steer the network traffic from one VNF to the next VNF in the service chain and on to the destination network. For example, MPLS over Generic Route Encapsulation (MPLSoGRE) or MPLS over User Datagram Protocol (MPLSoUDP) may be used to create overlay tunnels for layer 3 virtual private networks (L3VPNs) and/or Ethernet VPNs (EVPNs) to steer packets through a service chain.

There are several technical problems that may prevent PNFs from being incorporated into service chains. For example, PNFs do not typically support MPLS, which as noted above is often an overlay tunnel technology used to steer network traffic through a service chain. While both VNFs and PNFs may support VXLAN as a transport technology, replacing MPLS with VXLAN may cause looping problems within the service chain. In the case of VXLAN, the VXLAN Identifier (VNID) in a network packet typically maps to a virtual network (VN). A lookup in the VN's primary routing instance may be performed to find the left interface to the first service instance. However, the VNID carried by the network packet is typically the same as the packet is transmitted through the service chain. Thus, using VXLAN in current service chains may cause the same VNID to be received by a second service instance in the service chain. When the packet reaches the second service instance in the chain, the VNID may cause the packet to be looped back to the first service instance of the service chain because the VNID maps to the same virtual network and primary routing instance as the first service instance in the service chain.

In some examples, the controller may construct an inter-LR service chain to steer traffic originating from a BMS through at least one service chain that includes at least one PNF, and ultimately to a virtual machine using VXLAN as the transport technology. The controller may create two routing instances in each PNF of the service chain, and each routing instance can be assigned different VNIDs for a virtual network associated with a logical router. To direct traffic from the source network to a destination network via the service chain, the controller may obtain a route (referred to herein as "IP route") to the virtual machine associated with the destination network. The controller may modify the IP route to direct traffic from a source network to a left interface of a PNF in the service chain rather than directly to the destination network. For example, the controller may modify the IP route by setting the next hop and, in some instances, a VNID, or other next hop information that identifies a routing instance of a PNF of a service chain. The controller then advertises the modified IP route to the source network. This advertisement of the modified IP route by the controller and to the source network is referred to as a "re-originating" the IP route. A logical router of the source network may import the modified IP route from the controller, which causes the network device to steer traffic to the route next hop, e.g., the PNF at the head-end of the service chain.

As part of re-originating the IP route, the controller may also store the obtained IP route as an EVPN route. For example, the controller may, in addition to storing the IP route in an IP routing table for the source network, also store the IP route as an EVPN route (e.g., an EVPN Type-5 route that can specify the IP route for inter-subnet connectivity, i.e., connectivity of subdivisions of an IP network, in some cases across data centers) in an EVPN routing table for the source network. The controller may also set a next hop of the EVPN route to refer to logical router of the source network that hosts a PNF at the head-end of the service chain. The controller may advertise the modified EVPN route to a physical Top-of-Rack (TOR) switch that is directly connected to the BMS. The TOR switch may import the EVPN route from the controller to configure the TOR switch to steer data traffic originated from the BMS to the route next hop, e.g., the server hosting the service node at the head-end of the service chain.

In order to prevent looping, the controller may create two routing instances in each PNF, a first routing instance associated with a "left" logical router, and a second routing instance associated with a "right" logical router. The first and second routing instances may be configured with VNIDs that are associated with virtual networks of their corresponding logical router.

In this way, when a TOR switch receives data traffic originating from the BMS that is destined for the virtual machine of the destination network (e.g., a network of the "right" logical router), the TOR switch may steer traffic using, for example, Virtual Extensible Local Area Network (VXLAN), to the left interface of a PNF at the head-end of the service chain. When the PNF receives the data traffic, the PNF may perform its associated service on the data traffic, and determine a routing instance associated with a VNID in the VXLAN header of the data traffic. The VNID is used to determine which routing instance is to be used to determine the next hop of the data traffic. The PNF may perform a lookup of a routing table of the routing instance associated with the destination network (e.g., the "right" network), and forwards the data traffic from a right interface of the PNF to a TOR that hosts the left interface of the next PNF in the service chain. The PNF may swap a VNID label in the VXLAN header with a VNID assigned to a routing interface that is associated with the destination network. The next PNF in the service chain to receive the data traffic can use the VNID to determine a routing instance that includes routing tables that are used to determine how the data traffic is to be further forwarded.

The techniques of this disclosure may be implemented as part of a practical application that provides for one or more technical advantages. For example, the techniques may allow a customer to include PNFs in a service chain while avoiding subsequent PNFs or VNFs in the service chain from looping packets back to the first PNF in the service chain. As a result, customers can leverage their investment in PNFs by including the PNFs in service chains, rather than being limited to VNF-based service chains alone. Further, the use of PNFs may provide better network throughput, because PNFs are typically have greater throughput when performing operations when compared to VNFs with equivalent functionality. For example, PNFs may include specialized processors and other hardware to accelerate the types of processing performed on network packets.

In one example, a method includes creating, by a Software Defined Network (SDN) controller of a network system, a service chain comprising a plurality of Physical Network Functions (PNFs) including a first PNF and a second PNF, the service chain between a first logical router and a second logical router of the network system; creating, for each of the first PNF and the second PNF, a corresponding first routing instance and a corresponding second routing instance; configuring, for each of the first PNF and the second PNF, the corresponding first routing instance with a first label comprising a first Virtual eXtensible Local Area Network (VXLAN) Identifier (VNID) of a first virtual network associated with the first logical router and the second routing instance with a second label comprising a second VNID of a second virtual network associated with the second logical router; creating a first route between a first device on the first virtual network towards a second device on the second virtual network through the service chain, the first route specifying, in a first switch between the first device and the first PNF, the first VNID of the first routing instance of the first PNF as a first label for a next hop from the first switch to the first PNF, and specifying, in a second switch between the first PNF and the second PNF, the first VNID of the first routing instance of the second PNF as a second label for a next hop from the second switch to the second PNF; and pushing the first route to at least one of a plurality of switches communicatively coupled to one or more of the plurality of PNFs, the plurality of switches including the first switch and the second switch.

In another example, a controller includes one or more processors; a service chain unit executable by the one or more processors, the service chain unit configured to: create a service chain comprising a plurality of PNFs including a first PNF and a second PNF, the service chain between a first logical router and a second logical router of the network system, create, for each PNF, a corresponding first routing instance and a corresponding second routing instance, configure, for each PNF, the corresponding first routing instance with a first label comprising a first VNID of a first virtual network associated with the first logical router and the second routing instance with a second label comprising a second VNID of a second virtual network associated with the second logical router, and create a first route between a first device on the first virtual network towards a second device on the second virtual network through the service chain, the first route specifying, in a first switch between the first device and the first PNF, the first VNID of the first routing instance of the first PNF as a label for a next hop from the first switch to the first PNF, and specifying, in a second switch between the first PNF and the second PNF, the first VNID of the first routing instance of the second PNF as a label for a next hop from the second switch to the second PNF; and a control plane virtual machine executable by the one or more processors and configured to push the first route to at least one of a plurality of switches communicatively coupled to one or more of the plurality of PNFs, the plurality of switches including the first switch and the second switch.

In another example, a PNF device includes one or more processors; and a computer-readable storage device configured to store a first routing instance, a second routing instance, and instructions executable by the one or more processors to cause the PNF device to: receive configuration data for the first routing instance, the configuration data comprising a first label comprising a first VNID of a first virtual network associated with a first logical router and a second label comprising a second VNID of a second virtual network associated with a second logical router; configure the first routing instance with the first label; configure the second routing instance with the second label; receive first routing data, the first routing data specifying a next hop from the PNF device to a switch towards the second virtual network from the PNF device; configure the first routing instance with the first routing data; receive second routing data, the second routing data specifying a next hop from the PNF device to a switch towards a second virtual network from the PNF device; and configure the second routing instance with the second routing data; wherein the PNF device is configured in a service chain between a first logical router associated with the first virtual network and a second logical router associated with the second virtual network.

The details of one or more techniques of the disclosure are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
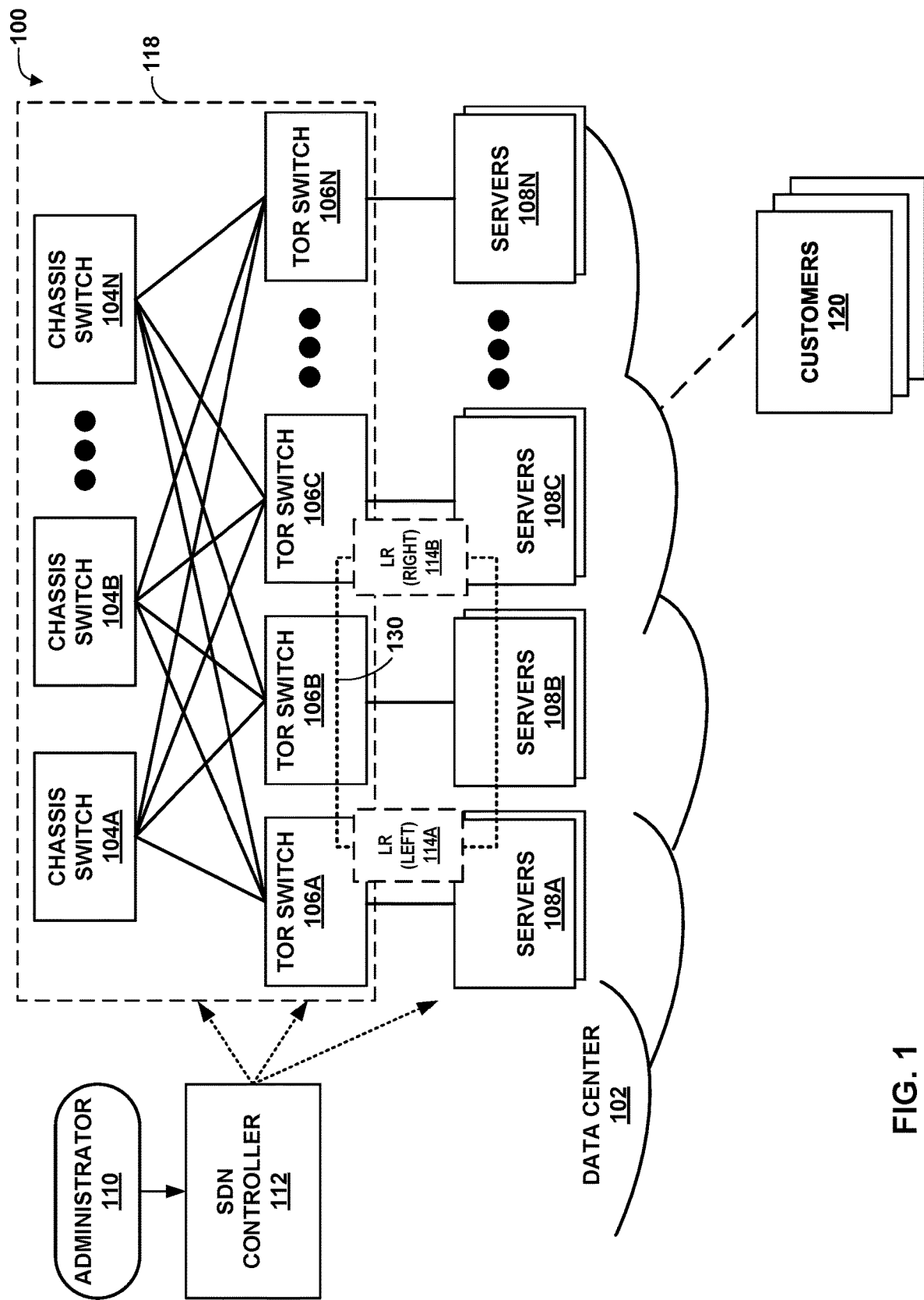
FIG. 1 is a block diagram illustrating an example network including a data center in which examples of the techniques described herein may be implemented.

FIG. 1 is a block diagram illustrating an example network 100 including a data center 102 in which examples of the techniques described herein may be implemented. In general, data center 102 provides an operating environment for applications and services for customers 120 coupled to the data center, e.g., by a service provider network (not shown). Data center 102 may, for example, host infrastructure equipment, such as networking and storage systems, redundant power supplies, and environmental controls. A service provider network that couples customers 120 to data center 102 may be coupled to one or more networks administered by other providers and may thus form part of a large-scale public network infrastructure, e.g., the Internet.

In some examples, data center 102 represents one of many geographically distributed network data centers. As illustrated in the examples of FIG. 1, data center 102 may be a facility that provides network services for customers 120. Customers 120 may be collective entities such as enterprises and governments or individuals. For example, a network data center may host web services for several enterprises and end users. Other example services may include data storage, virtual private networks, traffic engineering, file service, data mining, scientific- or super-computing, and so on. In some embodiments, data center 102 may be individual network servers, network peers, or otherwise.

In this example, data center 102 includes a set of storage systems and application servers 108A-108N (servers 108) interconnected via interconnected topology 118, which may comprise a switch fabric provided by one or more tiers of physical network switches and routers. Servers 108 may be respective bare metal servers (BMSs). In the examples of FIG. 1, interconnected topology 118 includes chassis switches 104A-104N (chassis switches 104) and top-of-rack (TOR) switches 106A-106N (TOR switches 106). For instance, chassis switches 104 may form spine nodes of a spine and leaf topology, while TOR switches 106 may form leaf nodes of the spine and leaf topology. TOR switch 206 may be a physical network device that provides layer two (e.g., MAC) and/or layer 3 (e.g., IP) routing and/or switching functionality. TOR switch 206 may include one or more processors and a memory, and that are capable of executing one or more software processors.

Servers 108 provide execution and storage environments for applications and data associated with customers 120 and may be physical servers, virtual machines or combinations thereof.

In general, interconnected topology 118 represents layer two (L2) and layer three (L3) switching and routing components that provide point-to-point connectivity between servers 108. In one example, interconnected topology 118 comprises a set of interconnected, high-performance yet off-the-shelf packet-based routers and switches that implement industry standard protocols. In one example, interconnected topology 118 may comprise off-the-shelf components that provide Internet Protocol (IP) over an Ethernet (IPoE) point-to-point connectivity.

In FIG. 1, SDN controller 112 provides a high-level controller for configuring and managing routing and switching infrastructure of data center 102. Details of virtual network controller 112 operating in conjunction with other devices of network 100 or other software-defined networks can be found in International Application Number PCT/US2013/044378, filed May 6, 2013, and in U.S. patent application Ser. No. 14/226,509, filed Mar. 26, 2014, and issued as U.S. Pat. No. 9,571,394, the entire contents of each of which are incorporated by reference. SDN controller 112 may communicate and manage the devices of data center 102 using an SDN protocol, such as the OpenFlow protocol. In addition, SDN controller 112 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

SDN controller 112 provides a logically—and in some cases, physically—centralized controller for facilitating operation of one or more virtual networks within data center 102 in accordance with examples of this disclosure. In some examples, SDN controller 112 may operate in response to configuration input received from network administrator 110. Additional information regarding SDN controller 112 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within interconnected topology 118, such as packet flows between servers 108, can traverse the physical network of interconnected topology 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection.

A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As shown in the examples of FIG. 1, each of TOR switches 106 is communicatively coupled to each of chassis switches 104 in interconnected topology 118. Similarly, in this example, each of chassis switches 104 is communicatively coupled to each of TOR switches 106. Accordingly, the number of paths from any one of TOR switches 106 to any other one of TOR switches 106 is equal to the number of chassis switches 104, in this example. Although the letter "N" is used to represent undefined numbers of both TOR switches 106 and chassis switches 104, it should be understood that there may be a different number of TOR switches 106 than chassis switches 104.

Servers 108 may correspond to respective tenants of data center 102. For example, servers 108A may correspond to a first tenant, servers 108B may correspond to a second tenant, and so on. Interconnected topology 118 allows for inter-tenant communication, e.g., between servers 108A-108N. In accordance with the techniques of this disclosure, SDN controller 112 may be configured to automatically configure one or more service devices to provide physical network functions (PNFs) or virtualized network functions (VNFs) to inter-tenant communications. The service devices may be, for example, physical devices such as TOR switches 106, chassis switches 104, or other devices connected thereto, or they may be virtual devices such as virtual machines, virtual routers, etc. The PNFs and VNFs may be, for example, firewall services, network address translation (NAT) services, intrusion detection and prevention (IDP) services, load balancing services, routing services, route reflectors, BNGs, EPCs or the like. PNFs typically provide their network functions using specialized hardware that is dedicated to applying the network function of the PNF to network data passing through the PNF. VNFs may provide the same network functions as a PNF, but are virtualized and thus may run on general purpose hardware such as a server 108. There may be more than one VNF configured on an individual server 108, and there may be other virtualized device instances running on the same server, such as virtual routers, virtual machines, and other such virtualized devices.

FIG. 1 illustrates two logical routers, a left logical router 114A and a right logical router 114B. A logical router (also referred to as a logical system) may be a network model including data and routines that represent layer 3 (L3) routing functionality. For example, a logical router may be a virtual router or VPN Routing and Forwarding (VRF) instance providing L3 routing functionality. A logical router may be modeled as a parent network having one or more child networks.

FIG. 1 also illustrates a service chain 130 between the left logical router 114A and right logical router 114B. Service chain 130 may include PNFs, VNFs, or a combination of PNFs and VNFs. Network data that is transmitted between network devices (virtual or physical) within a child network coupled to a single logical router may use L2 routing. Network data that is transmitted between network device on child networks having different parent logical routers may use L3 routing. Thus, in the example illustrated in FIG. 1, network traffic between the left logical router 114A and right logical router 114B uses L3 routing.

Service chain 130 may include PNFs, VNFs, or a combination of PNFs and VNFs that are between left logical router 114A and right logical router 114B. As described above, a service chain defines one or more network services to be applied in a particular order to provide a composite service for application to packet flows bound to the service chain. Thus, service chain 130 may be PNFs, VNFs, or a combination of PNFs and VNFs that are applied to network traffic between left logical router 114A and right logical router 114B in a defined order.

In some examples, SDN controller 112 receives a high-level configuration for the various network devices, e.g., from administrator 110, and translates the high-level configuration into low level configuration data. The high-level configuration data may be vendor-neutral, whereas the low-level configuration data may be vendor-specific, and thus, executable or otherwise usable by each respective one of chassis switches 104, TOR switches 106, and servers 108. The high-level configuration received by SDN controller 112 may be used to create service chain 130 and its constituent PNFs and/or VNFs.

Interconnected topology 118 may be implemented in various ways and does not necessarily include the devices or arrangement shown in FIG. 1. In one example, interconnected topology 118 is implemented as a spine and leaf topology. In such an example, chassis switches 104 are configured as spine switches (e.g., Layer 3 switches) and TOR switches 106 are configured as leaf switches. In other examples, interconnected topology 118 may be implemented as a Clos network, a Virtual Chassis Fabric (VCF), an Internet protocol (IP) Fabric, or an interconnected topology according to IEEE 802.1BR.

Figure 2A:
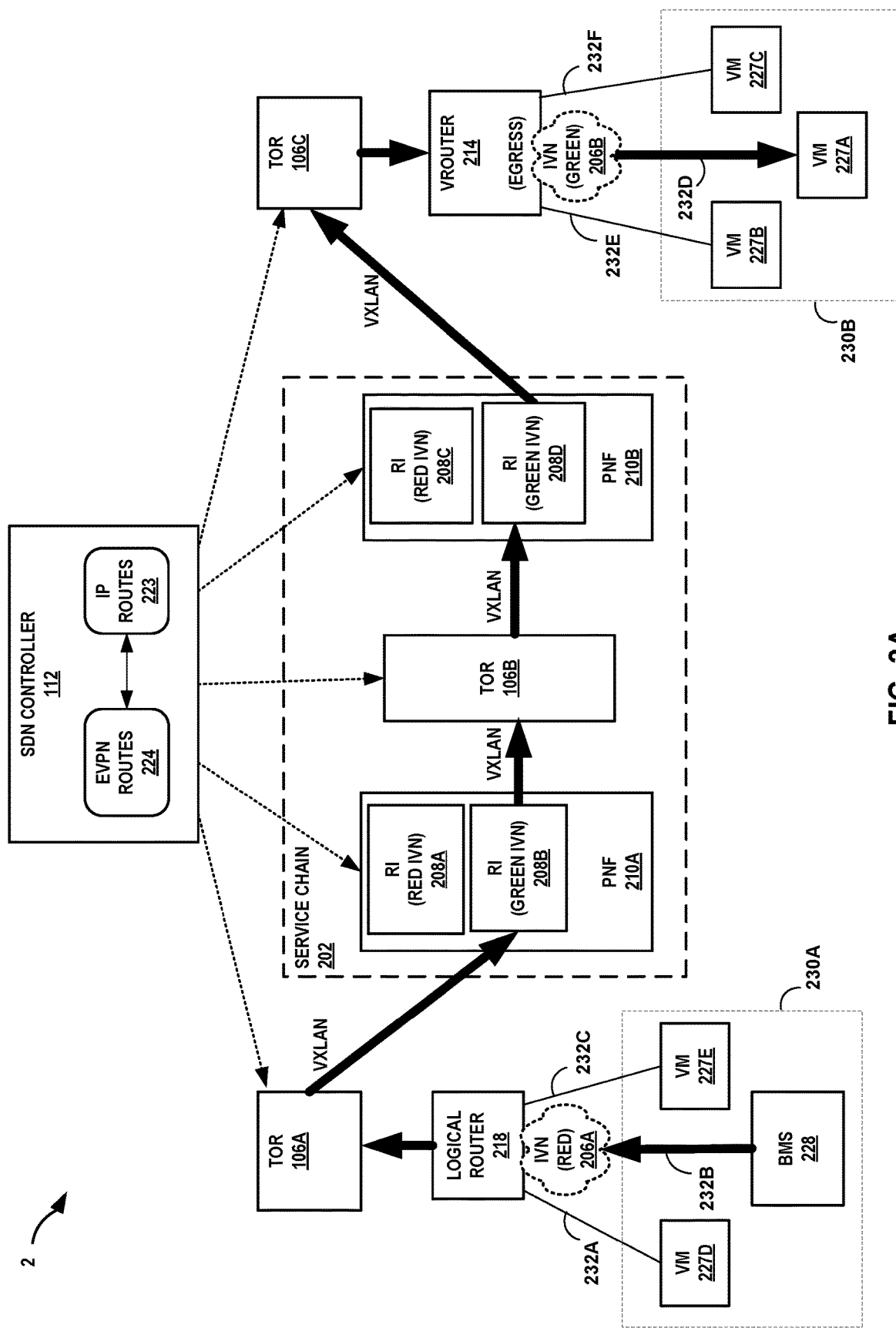
FIGS. 2A and 2B are block diagrams illustrating an example network system including an example service chain, in accordance with one or more aspects of the techniques described in this disclosure.
Figure 2B:
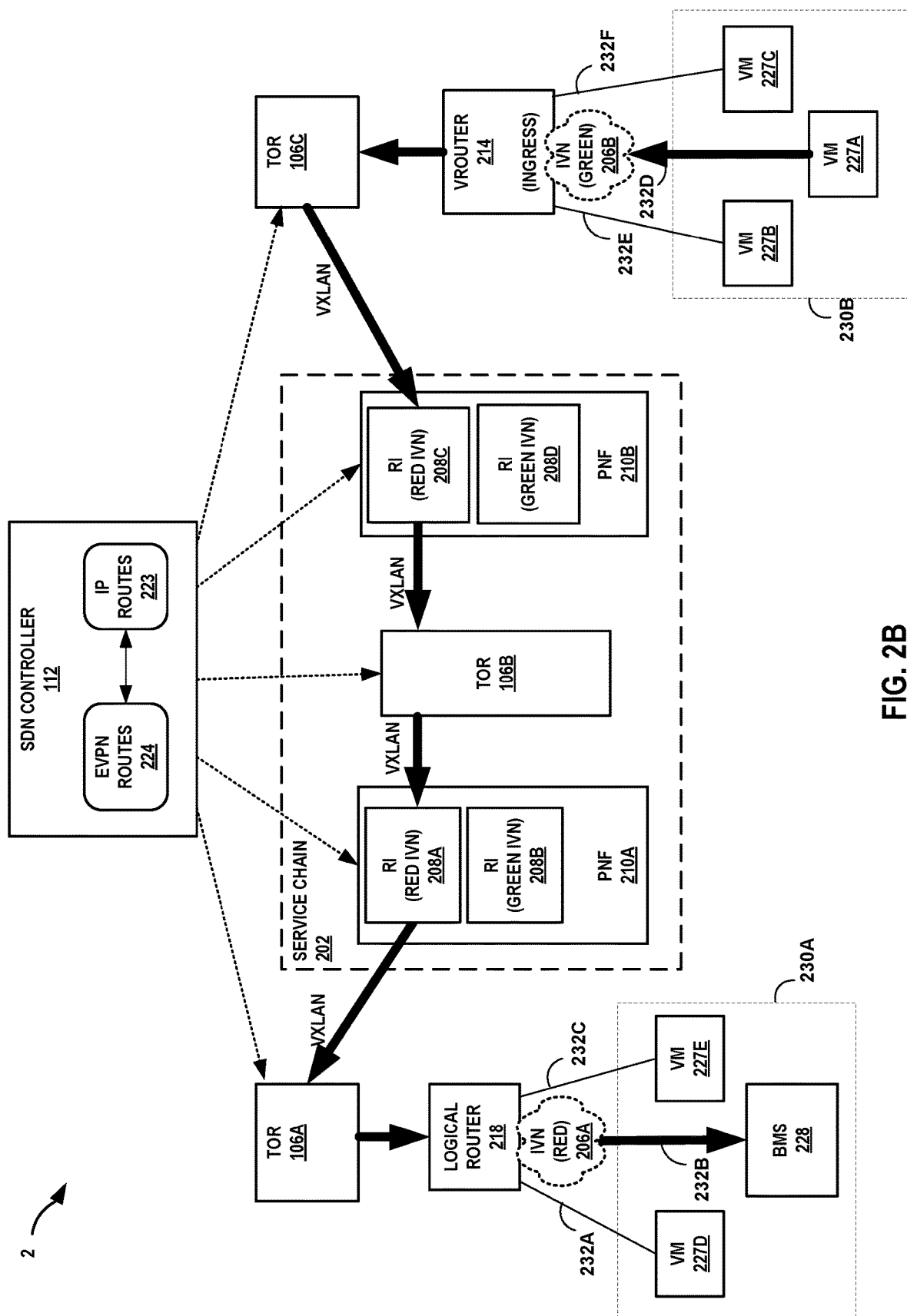

FIGS. 2A and 2B are block diagrams illustrating an example network system 2 including an example service chain 202, in accordance with one or more aspects of the techniques described in this disclosure. Service chain 202 is configured between two logical routers (LRs), logical router 218 and virtual router 214. As such, service chain 202 may be referred to as an "inter-LR" service chain. Network system 2 may include some or all of the components of network 100 of FIG. 1. In the examples illustrated in FIGS. 2A and 2B, network system 2 includes TORs 106A, 106B and 106C, PNFs 210A and 210B, a virtual router 214, bare metal server 228 ("BMS 228"), and VMs 227A-227D.

BMS 228 represents a server dedicated for use by a single customer (also referred to as "tenant" of a data center), which may be called a "single-tenant server." BMS 228 may provide dedicated hardware for use by the single customer to avoid so-called "noisy neighbor problems" that occur in multi-tenant servers. That is, unlike servers in which multiple customers may interact with the same physical hardware/server to interface with their individually allocated virtual router, BMS 228 may be dedicated for use only by a single customer.

FIG. 2A illustrates steering network traffic from a BMS on a source network through service chain 202 and on to a virtual machine on a destination network. In the example of FIG. 2A, PNFs 210A and 210B may be configured as part of a service chain 202. Service chain 202 may be configured between two logical routers, logical router 218A and virtual router 214. Logical router 218 communicatively couples a parent network providing connectivity to TOR switch 106A to BMS 228 and VMs 227D and 227E via child networks 232A-C. BMS 228 and VMs 227D and 227E form a cluster 230A. Logical router 218 and its child networks 232A-232C may be part of a network that will be referred to as the "red" network.

Virtual router 214 may be a logical router that communicatively couples a parent network providing connectivity to TOR switch 106C to VMs 227A-227C via child networks 232D, 232E and 232F respectively. Virtual router 214 may execute on one or more physical servers 108 (FIG. 1) for network system 2 of network 100. A server or servers 108 that execute virtual router 214 may provide an operating environment for execution of one or more customer-specific VMs. For example, the server that executes virtual router 214 may provide an operating environment for execution of VM 227A that may run customer applications such as Web servers, database servers, and/or enterprise applications for customers (not shown). A VM 227 may be referred to as a virtualized application workload (or just application workload) and generally represents a virtualized execution element, such as a virtual machine or a container. Virtual router 214 and its corresponding child networks 232D-232F will be referred to as the "green" network.

Logical routers such as logical router 218 and virtual router 214 may extend a network from physical routers and switches in a data center switch fabric into a virtual overlay network (e.g., tunnels) hosted in virtualized servers. For example, logical router 218 and virtual router 214 may dynamically create and manage one or more virtual networks, e.g., child networks 232, usable for communication between application workloads. In some examples, the overlay tunnels can be Virtual Extensible Local Area Network (VXLAN) tunnels that are used to tunnel traffic to a specific IP address of a physical device, such as a router or switch.

TOR switch 106A may be directly connected to BMS 228 by extending an attachment circuit to BMS 228 to provide BMS 228 with intra- or inter-network connectivity to virtual machines. As shown in FIG. 2A, the connectivity may be modeled using logical router 218. In some instances, TOR switches 106 may implement EVPN-VXLAN to provide connectivity between network devices. For example, TOR switch 106A may use VXLAN to encapsulate traffic from BMS 228 to forward the traffic to destination nodes. That is, traffic from BMS 228 uses EVPN as the control-plane with VXLAN being used as the encapsulation in the underlying data plane.

In accordance with one or more aspects of the techniques described herein, SDN controller 112 may construct an inter-LR service chain 202 between machines in cluster 203A (e.g., BMS 228 and VMs 227D and 227E) and machines in cluster 203B (e.g., VMs 227A-227C. In one implementation, SDN controller 112 may construct service chain 202 that steers traffic originating from BMS 228 to virtual machine 227A. In the example illustrated in FIG. 2A, SDN controller 112 configures PNF 210A and PNF 210B as part of service chain 202. PNFs 210A and 210B are communicably coupled via TOR switch 106B. As shown in FIG. 2A, network traffic between PNFs 210A and 210B along with TOR switch 106B may be encapsulated using VXLAN as the transport technology.

As part of configuring network system 2, SDN controller 112 may create internal virtual networks (IVNs) for logical routers. In the example illustrated in FIG. 2A, SDN controller may create IVN 206A representing logical router 218 for the red network, and IVN 206B representing virtual router 214 for the green network.

SDN controller 112 may create two routing instances for each PNF in a service chain. A first routing instance in each PNF may be associated with a network at the head end of the service chain (e.g., the "red" network) and a second routing instance associated with a network at the tail end of service chain 202 (e.g., the "green" network). A routing instance can be a collection of routing tables, assigned interfaces, and routing protocol parameters. The set of assigned interfaces in a routing instance can be associated with the routing tables of the routing instance, and the routing protocol parameters can determine the information in the routing tables. There can be multiple routing tables for a single routing instance. In the example illustrated in FIG. 2A, SDN controller creates routing instances 208A and 208B in PNF 210A, and routing instances 208C and 208D in PNF 210B. Routing instances 208A and 208C may be associated with interfaces associated with IVN 206A, and routing instances 208B and 208D may be associated with interfaces associated with IVN 206B. For example, SDN controller 112 can generate a VNID for each of the two routing instances in a PNF 210. The VNIDs map to the virtual networks associated with routing instance. Thus, the VNIDs for routing instances 208A and 208C each map to IVN 206A (red network), and the VNIDs for routing instances 206B and 206D each map to IVN 206B (green network).

As noted above, a routing instance includes routing tables. Entries in a routing table specify how network traffic received by a virtual or physical device is to be routed. One field used in this mapping is the "next hop" field that specifies a network address of the virtual or physical network device that should be the next device to receive the incoming network packet. In some aspects, SDN controller 112, with respect to BMS 228, may assign the next hop as the TOR that hosts the service interface (left interface) of the service chain and assign the VXLAN VNID as the label associated with the primary routing interface of the logical router's IVN. For example, TOR switch 106A hosts the left interface of PNF 210A. SDN controller 112 can install the route into a routing table in EVPN routes 224. Once installed, the routes may be advertised (e.g., pushed) to remote BGP EVPN peers including TORs 106.

SDN controller 112 may also set a next hop at each PNF 210 in service chain 202. For each PNF 210 in service chain 202, the next hop may be set to be the associated TOR that hosts the subsequent PNF in the service chain. For example, SDN controller 112 may set the next hop for PNF 210A as TOR switch 106B, with a next hop VNID of the routing instance of PNF 210B associated with the destination network (e.g., routing instance 208D). For the last PNF in a service chain (e.g., PNF 210B in the example shown in FIG. 2A), SDN controller 112 can set the next hop to the egress virtual router with the VNID label from the service routing instance associated with the destination virtual network. Thus, in the example illustrated in FIG. 2A, SDN controller 112 may set the next hop for PNF 210B as virtual router 214 associated with IVN 206B.

Virtual router 214 may provide IP routes reachable via virtual router 214, including an IP route to a destination endpoint, e.g., VM 227A. For example, virtual router 214 may provide an IP route that includes a destination IP address of VM 227A and a network address for a physical server that hosts VM 227A. In one implementation, SDN controller 112 may obtain the IP route from a virtual network (VN) agent of the server hosting virtual router 214.

SDN controller 112 may modify the obtained IP route to direct traffic to PNF 210A rather than directly to destination network (e.g., IVN 206B). For example, to direct traffic destined for VM 227A from a source network to service chain 202 for processing, SDN controller 112 modifies the next hop in the obtained IP route to refer to the "left" interface of PNF 210A. Modifying the next hop in the route may also, or alternatively, include modifying a label such as a VNID or other virtual network identifier, tunnel encapsulation information, or other next hop information that identifies PNF 210A.

Thus, to cause TOR switch 106A to steer traffic flows along service chain 202, SDN controller 112 may obtain from the destination network (e.g., IVN 206B) an IP route of virtual router 214 with a next hop to VM 227A, set the next hop of the IP route in TOR switch 106A to refer to PNF 210A, add the IP route to an IP routing table for the source network (e.g., IVN 206A), and advertise the modified IP route to devices on the source network. More specifically, SDN controller 112 may configure next hop and L3 labels of the IP route to cause TOR switch 106A to steer traffic to the "left" interface of PNF 210A. This advertisement of the modified IP route by the SDN controller 112 and to the source network is referred to as a "re-originating" the IP route. As part of the re-origination, SDN controller 112 can re-originate inet6 routes into EVPN type 5 routes.

SDN controller 112 may store the modified IP route in an IP routing table 223 for a routing instance for IVN 206B. The IP routing table may store IP addresses (e.g., IPv4 and/or IPv6 addresses) for dynamically learned routes, such as an IP address for VM 227A. In some examples, the IP routing table 223 may include a BGP routing table that stores layer 3 VPN routes learned via BGP.

In addition to storing the IP route in the IP routing table 223 for the routing instance for destination network IVN 206B, SDN controller 112 may also store the IP route as an EVPN route in an EVPN routing table 224 for the routing instance. The EVPN routing table 224 may store EVPN related routes, such as EVPN Type-5 routes that specify IP prefixes (e.g., IP address for VM 227A) for inter-subnet connectivity across data centers.

When TOR switch 106A receives data traffic originating from BMS 228 and destined for VM 227A, TOR switch 106A may perform a lookup of its forwarding table to determine the next hop, which, in the example illustrated in FIG. 2A, is the "left" interface of PNF 210A. TOR switch 106A may encapsulate a VXLAN outer packet to the data traffic to tunnel the data traffic to the "left" interface of PNF 210A. A VNID field of the VXLAN outer packet may be the VNID associated with routing instance 208B. PNF 210A may apply a service to the data traffic and forward the data traffic to the next hop. In the example illustrated in FIG. 2A, PNF 210A uses the routing instance associated with the VNID (e.g., routing instance 208B of PNF 210A) to perform a table lookup to determine that the next hop is TOR switch 106B. PNF 210A may perform a "label swap" to replace the VNID in the VXLAN header with a VNID for routing instance 208D. TOR switch 106B may determine that the next hop is the "left" interface of PNF 210B and swap the label in the VXLAN header to the VNID associated with routing instance 208D of PNF 210B. PNF 210B may apply services to the data traffic. PNF 210B may utilize routing instance 208D to determine, based on a routing table of routing instance 208D that the next hop for the data traffic is TOR switch 106C. The data traffic is forwarded to TOR switch 106C via the "right" interface of PNF 210B. TOR switch 106C then uses next hop information in its routing tables to determine that virtual router 214 is the next hop, which in turn forwards the data traffic to destination VM 227A.

FIG. 2B illustrates steering traffic from a virtual machine back to a BMS. In some examples, SDN controller 112 may compute a route through service chain 202 for traffic flowing in the opposite direction as that described in FIG. 2A, i.e., from VM 227 to BMS 228. For example, SDN controller 112 may obtain an EVPN route having a destination address for BMS 228.

In accordance with one or more aspects of the techniques disclosed herein, SDN controller 112 may also re-originate the IP routes as EVPN routes to extend the service chain 202 to BMS 228. For example, SDN controller 112, in addition to re-originating the IP route obtained from a destination network (e.g., IVN 206B) into a source network (e.g., IVN 206A) by modifying next hops, SDN 112 may re-originate the IP route as EVPN route with a next hop referring a TOR switch 106C that hosts the "right" interface of PNF 210B. Modifying the next hop in the route may include modifying a label (e.g., a VNID) and a destination network address for an underlying physical network to point to a network address of the right interface of service chain 202 (e.g., PNF 210B).

When traffic originates on the right side of service chain 202 (e.g., VM 227A), and is destined to the left side of service chain 202 (e.g., BMS 228), there may not be any route towards the left side of service chain 202. SDN controller 112, upon receiving EVPN Type 5 routes from the remote TORs 106 may re-originate a new service chain path into red.inet.0 table with a remote TOR switch (e.g., TOR switch 106C) as the next hop and VXLAN as the encapsulation type with an associated L3 VNID. This route may be replicated to other network devices by a service chain module of SDN controller 112 using the appropriate L3 label (from the service routing instance 208) at each hop. In some aspects, to import the EVPN route, TOR switch 106A is configured with the appropriate route target. For example, TOR switch 106A may auto-generate a route target (e.g., 80000*).

SDN controller 112 may re-originate the obtained EVPN route as an IP route. For example, in addition to storing the EVPN route in the EVPN routing table 224, SDN controller 112 may also store the EVPN route as an IP route in an IP routing table 223 for the routing instance. SDN controller 112 may set the next hop in the IP route to TOR switch 106C. SDN controller 112 may advertise the IP route to the destination network, e.g., IVN 206A. Virtual router 214 may import the IP route and next hop referring to TOR switch 206C such that virtual router 214 is configured to steer data traffic received VM 227A to TOR switch 106C.

Additionally, as part of the re-origination of routes, SDN controller 112 may assign L3 labels to the next hops of routing tables such that the next hop includes a label associated with VNIDs of the destination network (in the example of FIG. 2B, the red network 206A). These VNIDs may be VNIDs associated with routing instances 208A and 208C.

When virtual router 214 receives data traffic originating from VM 227A and destined for BMS 228, virtual router 214 performs a lookup of its forwarding table and determines that the next hop is TOR switch 106C. Virtual router 214 may encapsulate a VXLAN outer packet to the data traffic to tunnel the data traffic to TOR switch 106C. When TOR switch 106C receives the VXLAN encapsulated data traffic, TOR switch 106C de-encapsulates the VXLAN outer header and performs a lookup of the next hop based on the VNID. TOR switch 106C may determine from the lookup that the next hop PNF 210B and forwards the data traffic to the right interface of PNF 210B. PNF 210B can use the VNID to determine that routing instance 208C is to be used to forward the data traffic to the next hop, in this case, TOR switch 106B. PNF 210B can perform a label swap as part of forwarding the traffic to cause the traffic to be forwarded by TOR switch 106B to PNF 210A. PNF 210A can determine, from the VNID in the VXLAN header, that routing instance 208A is to be used to determine how the data traffic is to be forwarded. A lookup of the appropriate routing table in routing instance 208A determines that TOR switch 106A is the next hop for traffic destined for BMS 228.

The examples illustrated in FIGS. 2A and 2B show a service chain 202 with two PNFs. A service chain may include more than two PNFs. Each of the PNFs in a service chain may be communicatively coupled to a TOR. As noted above, each PNF may be configured with two routing instances 208. Additional examples of a service chain between virtual entities of different networks is further described in U.S. Pat. No. 9,634,936, entitled "SERVICE CHAINING ACROSS MULTIPLE NETWORKS," filed Jun. 30, 2014, the entire contents of which is incorporated by reference herein.

Figure 3:
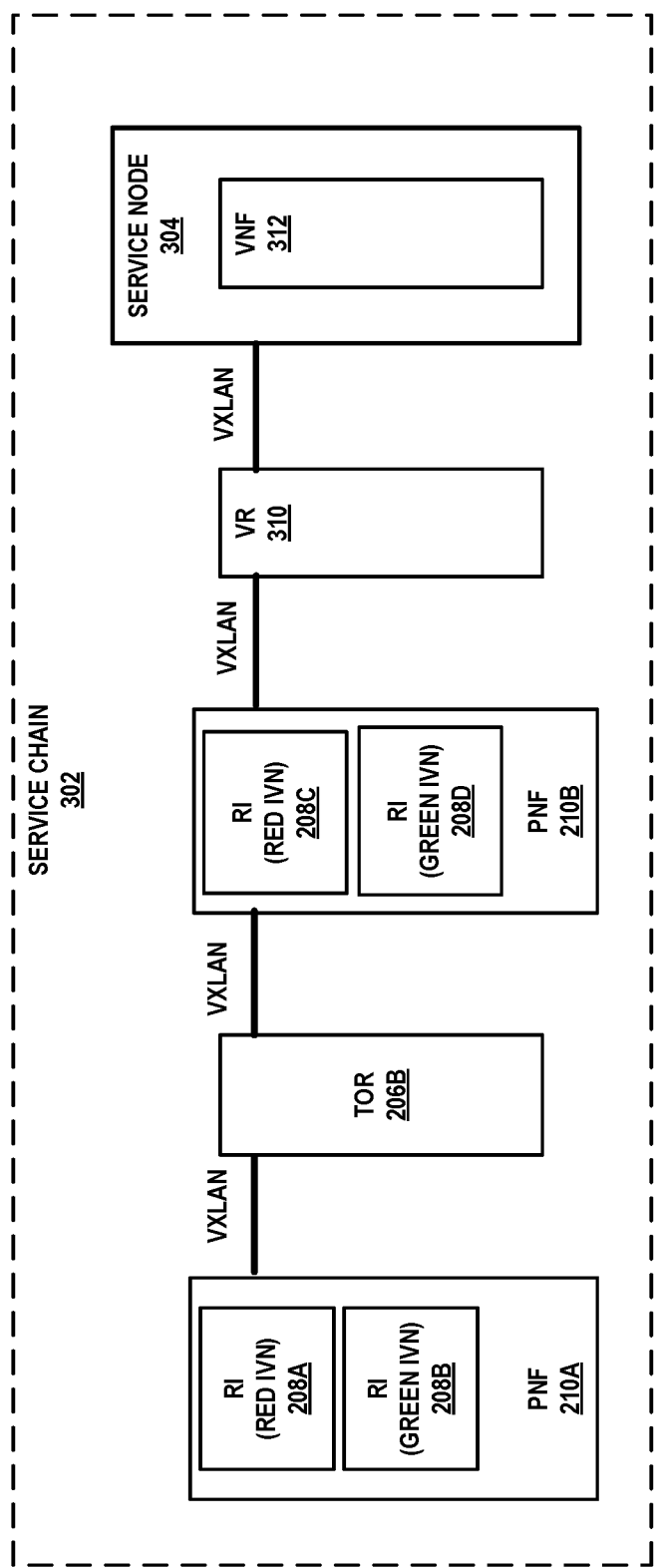
FIG. 3 is a block diagram illustrating an example service chain having a combination of physical network functions and virtualized network functions in accordance with one or more aspects of the techniques described in this disclosure.

FIG. 3 is a block diagram illustrating an example service chain having a combination of physical network functions and virtualized network functions in accordance with one or more aspects of the techniques described in this disclosure. In the example of FIGS. 2A and 2B, service chain 202 includes PNFs only. In some implementations, a service chain may include both PNFs and VNFs, as shown in FIG. 3.

In the example shown in FIG. 3, service chain 302 may include PNF 210A, PNF 210B and TOR switch 106B as described above with respect to FIGS. 2A and 2B. Additionally, service chain 302 may include service node 304 hosting a VNF 312, and a virtual router 310 coupling service node 302B to PNF 210B. VNF 312 of service node 304 may provide a service to data traffic such as a firewall, Deep Packet Inspection (DPI), Intrusion Detection System (IDS), Intrusion Preventions System (IPS), carrier grade network address translation (CG-NAT), media optimization (voice/video), IPSec/VPN services, transport control protocol (TCP) optimization and header enrichment, caching, HTTP filtering, counting, accounting, charging, and load balancing of packet flows or other types of services applied to network traffic.

SDN controller may construct service chain 302 in a similar manner to that describe above with respect to service chain 202 of FIGS. 2A and 2B. However, when coupling a PNF and a VNF in a service chain, SDN controller may use a virtual router instead of a TOR to couple the PNF to the VNF. Thus, in the example illustrated in FIG. 3, PNF 210B is coupled to VNF 312 (i.e., the service node 302 hosting VNF 312) via virtual router 310.

The example illustrated in FIG. 3 shows a VNF as the tail end of service chain 302. It will be appreciated that a VNF may appear in other places in a service chain. For example, a VNF may be configured as the head end of a service chain, or between VNFs and PNFs in a service chain.

Figure 4:
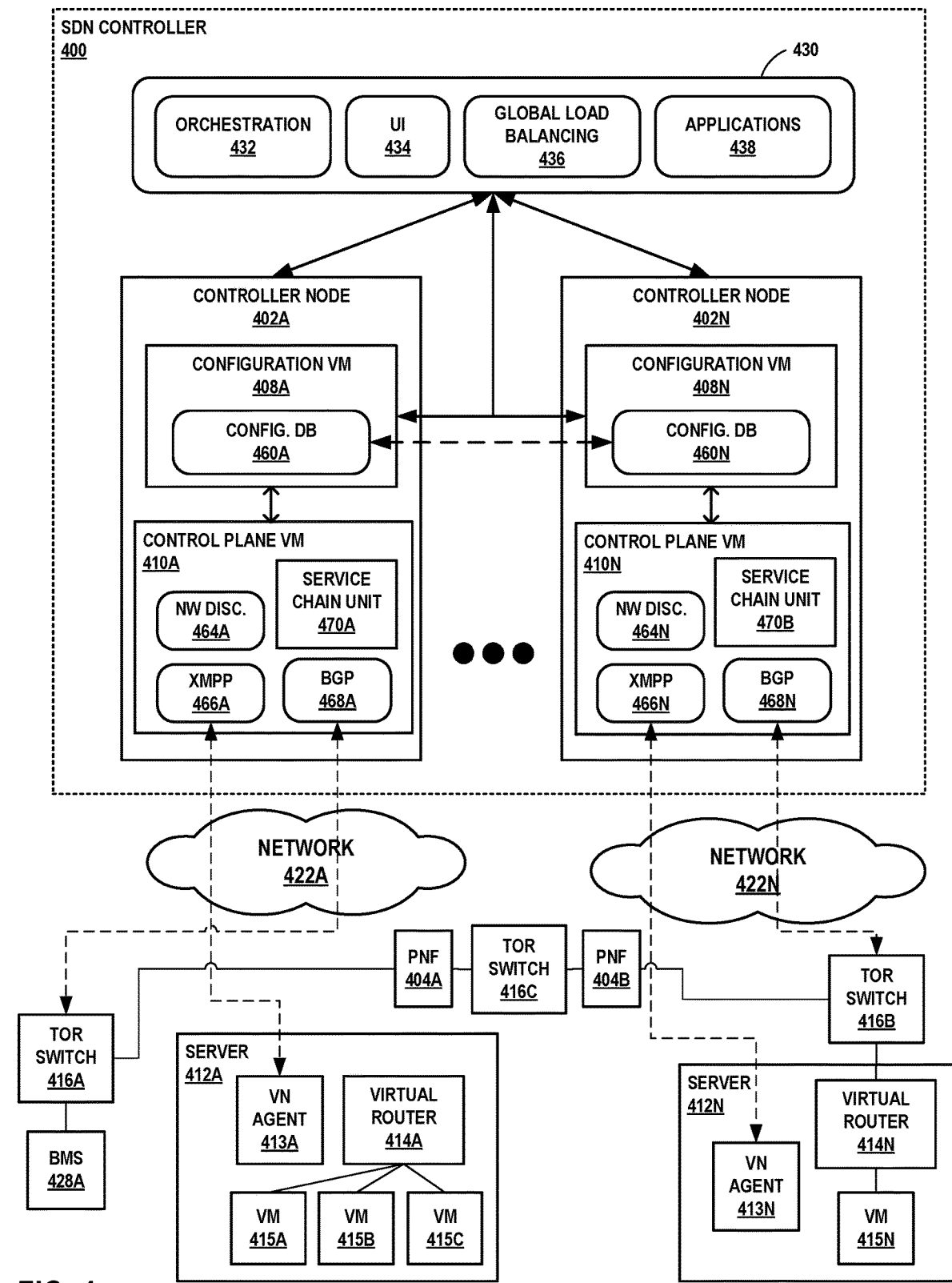
FIG. 4 illustrates an example controller operating in accordance with one or more aspects of the techniques described in this disclosure.

FIG. 4 illustrates an example controller operating in accordance with one or more aspects of the techniques described herein. SDN controller 400 may represent an example instance of SDN controller 112 of FIGS. 1, 2A and 2B. Although illustrated and described as a physically distributed and "virtual" network controller, some examples of SDN controller 400 may be both physically and logically centralized within an appliance or server.

As illustrated in the example of FIG. 4, SDN controller 400 includes one or more controller nodes 402A-402N (collectively, "controller nodes 402"). Each of controller nodes 402 may represent a distributed and "virtual" network controller of SDN controller 400. Controller nodes 402 that peer with one another according to a peering protocol operating over a network, which may represent an example instance of a switch fabric or L2/L3 IP fabric. In the illustrated example, controller nodes 402 peer with one another using a Border Gateway Protocol (BGP) implementation, an example of a peering protocol. In this sense, controller nodes 402A and 402N may represent a first controller node device and a second controller node device peered using a peering protocol. Controller nodes 402 include respective network discovery modules 464A-464N to discover network elements of the network.

Controller nodes 402 provide, to one another using the peering protocol, information related to respective elements of the virtual network managed, at least in part, by the controller nodes 402. For example, controller node 402A may manage a first set of one or more servers operating as virtual network switches for the virtual network. Controller node 402A may send information relating to the management or operation of the first set of servers to controller node 402N by BGP 468A. Other elements managed by controller nodes 402 may include network controllers and/or appliances, network infrastructure devices (e.g., L2 or L3 switches), communication links, firewalls, and controller nodes 402, for example. Because controller nodes 402 have a peer relationship, rather than a master-slave relationship, information may be shared between the controller nodes 402.

Each of controller nodes 402 may include substantially similar components for performing substantially similar functionality, said functionality being described hereinafter primarily with respect to controller node 402A.

Controller node 402A may include a configuration database 460A for storing configuration information related to a first set of elements managed by controller node 402A. Control plane components of controller node 402A may store configuration information to configuration database 460A using interface 440. Controller node 402A may share at least some configuration information related to one or more of the first set of elements managed by controller node 402A and stored in configuration database 460A, as well as to receive at least some configuration information related to any of the elements managed by others of controller nodes 402. Some or all of IP routing table 223 and EVPN routing table 224 as described in FIGS. 2A and 2B) may be stored by control nodes to facilitate operation of network discovery modules and BGPs 468.

SDN controller 400 may perform any one or more of the illustrated SDN controller operations represented by modules 430, which may include orchestration 432, user interface 434, global load balancing 436, and one or more applications 438. SDN controller 400 executes orchestration module 432 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. SDN controller global load balancing 436 executed by SDN controller 400 supports load balancing of analytics, configuration, communication tasks, e.g., among controller nodes 402. Applications 438 may represent one or more network applications executed by controller nodes 402 to, e.g., change topology of physical and/or virtual networks, add services, or affect packet forwarding.

User interface 434 includes an interface usable to an administrator (or software agent) to control the operation of controller nodes 402. For instance, user interface 434 may include methods by which an administrator may modify, e.g., configuration database 460A of controller node 402A. Administration of the one or more virtual networks operated by SDN controller 400 may proceed by uniform user interface 434 that provides a single point of administration, which may reduce an administration cost of the one or more virtual networks.

Controller node 402A may include a control unit such as a control plane virtual machine (VM) 410A that executes control plane protocols to control and monitor a set of network elements. Control plane VM 410A may in some instances represent a native process. In the illustrated example, control plane VM 410A executes BGP 468A to provide information related to the first set of elements managed by controller node 402A to, e.g., control plane virtual machine 462N of controller node 402N. Control plane VM 410A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 410A-410N) may execute different software versions. In one or more aspects, e.g., control plane VM 410A may include a type of software of a particular version, and the control plane VM 410N may include a different version of the same type of software.

Control plane VM 410A may communicate with physical and virtual routers using a communication protocol. Virtual routers or switches facilitate overlay networks in one or more virtual networks. In the illustrated example, control plane VM 410A uses Extensible Messaging and Presence Protocol (XMPP) 466A to communicate with at least one virtual router for a virtual network (e.g., virtual routers 14 of FIGS. 1, 2A and 2B). Virtual network route data, statistics collection, logs, and configuration information may in accordance with XMPP 466A be sent as XML documents for communication between control plane VM 410A and the virtual routers. Control plane VM 410A may in turn route data to other XMPP servers (such as an analytics collector) or may retrieve configuration information on behalf of one or more virtual network switches. Control plane VM 410A may further execute a communication interface 440 for communicating with configuration virtual machine (VM) 408A associated with configuration database 460A. Communication interface 440 may represent an IF-MAP interface.

Controller node 402A may further include configuration VM 408A to store configuration information for network elements and to manage configuration database 460A. Configuration VM 408A, although described as a virtual machine, may in some aspects represent a native process executing on an operating system of controller node 402A. In some aspects, configuration VM 408A may include a configuration translator, which may translate a user friendly higher-level virtual network configuration to a standards based protocol configuration (e.g., a BGP L3VPN configuration), which may be stored using configuration database 460A.

Virtual routers may be controlled by SDN controller 400 implement the layer 4 forwarding and policy enforcement point for one or more end points and/or one or more hosts. The one or more end points or one and/or one or more hosts may be classified into a virtual network due to configuration from control plane VM 410A. Control plane VM 410A may also distribute virtual-to-physical mapping for each end point to all other end points as routes. These routes may give the next hop mapping virtual IP to physical IP and encapsulation technique used (e.g., one of IPinIP, NVGRE, VXLAN, etc.).

Any of the virtual network controller operations represented by modules 430 may direct/request controller nodes 402 to establish a service chain for steering traffic, from a BMS and virtual machine across different networks, through a sequence of one or more PNFs 404 and/or VNFs (not shown in FIG. 4). UI 434, for instance, may receive a client request to create a service chain (e.g., service chains 202, 302 of FIG. 2A, FIG. 2B and FIG. 3) for client traffic. As another example, one of applications 438 may request a service chain for application traffic for the application.

Control plane VMs 410A-410N also include respective service chain units 470A-470N that implement service chains in accordance with techniques described in this disclosure. Operations of service chain units 470A-470N are described hereinafter with respect to service chain unit 470A for ease of description purposes. Service chain unit 470A monitors routes obtained by control plane VMs 410 via XMPP 466A from virtualized elements controlled by SDN controller 400 as well as, in some instances, routes generated by SDN controller 400 for configuring the elements.

In accordance with techniques described herein, service chain unit 470A may establish requested service chains in part by modifying and re-originating routes into networks of elements controlled by SDN controller 400 using techniques described herein. For example, SDN controller 400 may receive a request (e.g., via UI 434) to configure an inter-LR service chain between BMS 428A and a destination endpoint, e.g., VM 415N, via one or more PNFs or VNFs SDN controller 400 may configure network elements to direct traffic from a source network 422A to a destination network 422N via one or more TORs and/or service node VMs 415. To direct traffic from source network 422A to a destination network 422N via the PNFs and VNFs of a service chain, service chain unit 470A may configure two routing instances in the PNFs of a service chain, and generate VNIDs for the routing instances. Service chain unit 470A may obtain a route and re-originate the route as described above with respect to FIGS. 2A and 2B. For example, SDN controller 400 may use XMPP 466N to obtain an IP route to a destination endpoint, e.g., VM 415N. In one example, SDN controller 400 may obtain the IP route from a virtual network agent 413N of server 412N hosting VM 415N. SDN controller 400 may store the IP route in an IP routing table in control plane VM 410A (not shown). Service chain unit 470A may the re-originate the route, including assigning VNIDs as L3 labels for next hops through the service chain. Although the examples described herein are described with specific control plane VMs, the techniques can be performed by any of the control plane VMs of SDN controller 400.

Figure 5:
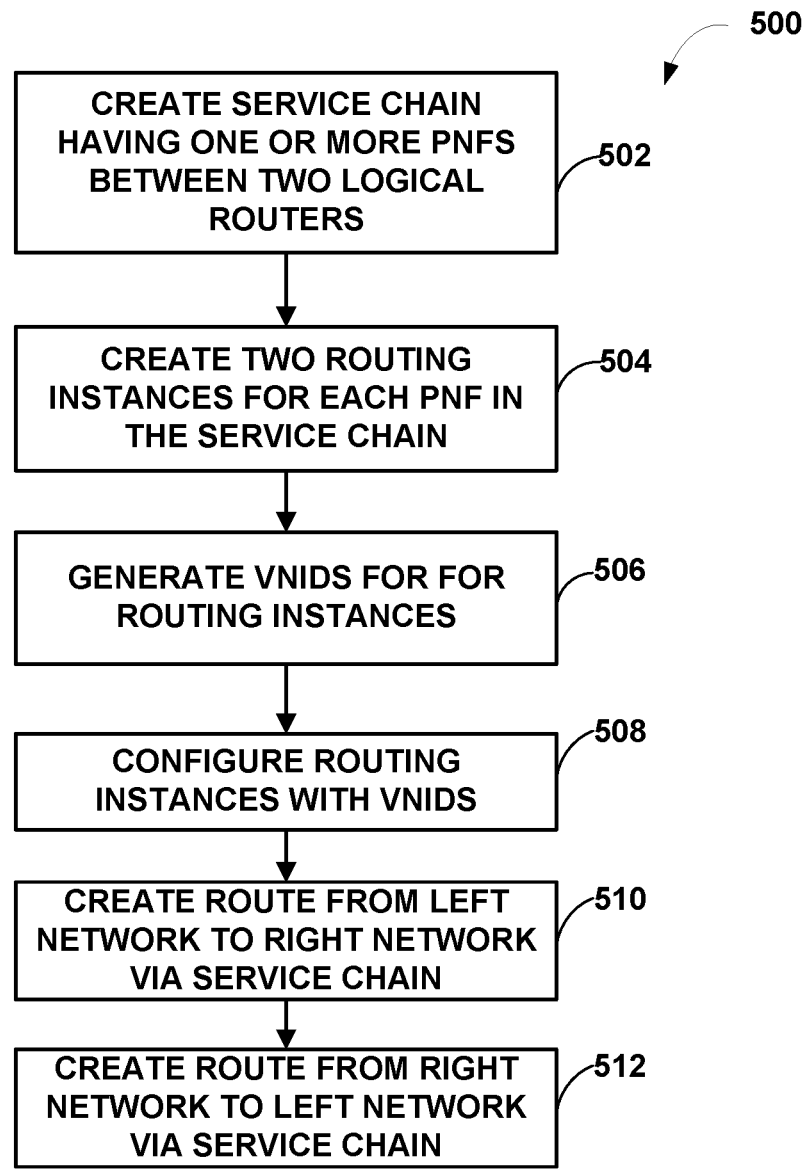
FIG. 5 is a flowchart illustrating an example operation 400 of a controller providing a service chain that includes at least one PNF, in accordance with one or more aspects of the techniques described in this disclosure.

FIG. 5 is a flowchart 500 illustrating example operations for providing inter-LR service chaining, in accordance with one or more aspects of the techniques described in this disclosure. While described with respect to SDN controller 112 of FIG. 1, the example operations of flowchart 500 may be applied by any controller, server, appliance, management system, or other suitable network device, to perform techniques described herein. The operations FIG. 5 are described with respect to configuring service chain 202 in network system 2 of FIGS. 2A and 2B and configuring the service chain 202. In some examples, SDN controller 112 may perform the operations of flowchart 500 to provide inter-LR service chaining from a bare metal server to a virtual execution element (e.g., a virtual machine).

In the example of FIG. 5, SDN controller 112 may create a service chain between two logical routers (e.g., logical router 218 and virtual router 214) (502). The service chain may include one or more PNFs communicatively coupled by a TOR.

SDN controller 112 may create two routing instances for each PNF in the service chain (504). The first routing instance may be associated with a virtual network on the left side of the service chain (e.g., a virtual network at the head-end of the service chain such as IVN 206A of FIG. 2). The second routing instance may be associated with a virtual network on the right side of the service chain (e.g., a virtual network at the tail-end of the service chain such as IVN 206B of FIG. 2).

SDN controller 112 may generate VNIDs for each of the routing instances of each PNF in the service chain. In some examples, the VNIDs are generated for the virtual network associated with the routing instance. For example, the first routing instance of each PNF will have a VNID associated with the left network, and the second routing instance of each PNF will have a VNID associated with the right network. The VNIDs generated for routing instances associated with the left network may be different from one another, as is the case for the VNIDs generated for the routing instances associated with the right network. SDN controller 112 may configure the routing instances with their corresponding VNIDs (508).

SDN controller 112 may create a first route through the service chain from one or more devices on the left network (e.g., a source network) to one or more devices on the right network (e.g., a destination network) (510). SDN controller 112 may obtain, from the destination network, a route that specifies a next hop to a destination address reachable by the destination network. In some examples, SDN controller 112 may obtain an IP route from the destination network that specifies a virtual machine (e.g., VM 227A of FIG. 2A) that is reachable by the destination network (e.g., IVN 206B).

SDN controller 112 may create the first route through the service chain by modifying the route obtained from the destination network. For example, SDN 112 may modify the route by specifying the network address of a PNF as the next hop for the destination address for packets received from devices on the left network. In some examples, specifying the next hop includes specifying a network address and a VNID of the first routing instances as a label for the next hop. Thus, SDN controller 112 modifies the obtained IP route to direct traffic to one or more of PNFs of the service chain rather than directly to destination network. In some aspects, if SDN controller 112 obtains an IP route from the destination network, SDN controller 112 may re-originate the IP route as an EVPN route to the PNF. For example, SDN controller 112 may re-originate an IP6 route as an EVPN type 5 route.

SDN controller 112 may continue to create the first route through the service chain by specifying, for each remaining PNF in the service chain towards the right network, a network address and the VNID of the first routing instance of the next PNF in the service chain towards the right network as a label for the next hop.

SDN controller 112 may create a second route through the service chain, wherein the second route is route from the right network back to the left network (e.g., from the destination network back to the source network) (512). In this case, SDN controller 112 may specify a route from a TOR coupled to a logical router on the right side of the service chain (e.g., virtual router 214 of FIG. 2B) to the PNF at the tail-end of the service chain (e.g., PNF 210B of FIG. 2B). In some aspects, the next hop configured at the TOR may specify the network address and VNID associated with the second routing instance of the PNF at the tail-end of the service chain. In the case of creating the second route SDN controller 112 may re-originate an EVPN route as an IP route to the PNF. For example, SDN controller 112 may re-originate an EVPN type 5 route to an IP6 route.

SDN controller 112 may continue to create the second route through the service chain by specifying, for each remaining PNF in the service chain towards the left network, a network address and the VNID of the second routing instance of the next PNF in the service chain towards the right network as a label for the next hop.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A software-defined networking (SDN) controller comprising:
processing circuitry having access to memory, the processing circuitry configured to:
obtain a first route, the first route comprising a destination address of a virtual network; and
output a second route comprising (1) the destination address, (2) a next hop address that is a network address for a device, and (3) a label identifying a routing instance configured in a physical network function (PNF) device,
wherein the label is different than a Virtual eXtensible Local Area Network (VXLAN) identifier for the virtual network.

2. The SDN controller of claim 1,
wherein the label comprises a VXLAN identifier.

3. The SDN controller of claim 1, wherein the processing circuitry is configured to:
configure the routing instance in the PNF device; and
configure the PNF device to use a routing table of the routing instance for forwarding a packet that includes the label identifying the routing instance.

4. The SDN controller of claim 1,
wherein the device comprises a top of rack switch.

5. The SDN controller of claim 1,
wherein the second route comprises an Ethernet Virtual Private Network (EVPN) Type-5 route that specifies the destination address using an Internet Protocol (IP) prefix.

6. The SDN controller of claim 1,
wherein the PNF device comprises a first PNF device,
wherein the label comprises a first label, and
wherein the device comprises a first device, and
wherein the processing circuitry is configured to output a third route comprising (1) the destination address, (2) a next hop address that is a network address for a second device, and (3) a second label identifying a routing instance configured in a second PNF device,
wherein the second label is different than the first label and is different than the VXLAN identifier for the virtual network.

7. The SDN controller of claim 6, wherein the processing circuitry is configured to:
configure the routing instance in the second PNF device; and
configure the second PNF device to use a routing table of the routing instance configured in the second PNF device for forwarding a packet that includes the label identifying the routing instance configured in the second PNF device.

8. A method comprising:
obtaining, by a software-defined networking (SDN) controller, a first route, the first route comprising a destination address of a virtual network; and
outputting, by the SDN controller, a second route comprising (1) the destination address, (2) a next hop address that is a network address for a device, and (3) a label identifying a routing instance configured in a physical network function (PNF) device,
wherein the label is different than a Virtual eXtensible Local Area Network (VXLAN) identifier for the virtual network.

9. The method of claim 8,
wherein the label comprises a VXLAN identifier.

10. The method of claim 8, further comprising:
configuring the routing instance in the PNF device; and
configuring the PNF device to use a routing table of the routing instance for forwarding a packet that includes the label identifying the routing instance.

11. The method of claim 8,
wherein the device comprises a top of rack switch.

12. The method of claim 8,
wherein the second route comprises an Ethernet Virtual Private Network (EVPN) Type-5 route that specifies the destination address using an Internet Protocol (IP) prefix.

13. The method of claim 8,
wherein the PNF device comprises a first PNF device,
wherein the label comprises a first label, and
wherein the device comprises a first device,
the method further comprising:
outputting a third route comprising (1) the destination address, (2) a next hop address that is a network address for a second device, and (3) a label identifying a routing instance configured in a second PNF device,
wherein the second label is different than the first label and is different than the VXLAN identifier for the virtual network.

14. The method of claim 13, further comprising:
configuring the routing instance in the second PNF device; and
configuring the second PNF device to use a routing table of the routing instance configured in the second PNF device for forwarding a packet that includes the label identifying the routing instance configured in the second PNF device.

15. Non-transitory computer-readable media comprising instructions that, when executed by processing circuitry, cause the processing circuitry to:
obtain a first route, the first route comprising a destination address of a virtual network; and
output a second route comprising (1) the destination address, (2) a next hop address that is a network address for a device, and (3) a label identifying a routing instance configured in a physical network function (PNF) device,
wherein the label is different than a Virtual eXtensible Local Area Network (VXLAN) identifier for the virtual network.

16. The media of claim 15,
wherein the label comprises a VXLAN identifier.

17. The media of claim 15, wherein the instructions further cause the processing circuitry to:
configure the routing instance in the PNF device; and
configure the PNF device to use a routing table of the routing instance for forwarding a packet that includes the label identifying the routing instance.

18. The media of claim 15,
wherein the device comprises a top of rack switch.

19. The media of claim 15,
wherein the second route comprises an Ethernet Virtual Private Network (EVPN) Type-5 route that specifies the destination address using an Internet Protocol (IP) prefix.

20. The media of claim 15,
wherein the PNF device comprises a first PNF device, wherein the label comprises a first label, and
wherein the device comprises a first device,
wherein the instructions further cause the processing circuitry to:
output a third route comprising (1) the destination address, (2) a next hop address that is a network address for a second device, and (3) a second label identifying a routing instance configured in a second PNF device,
wherein the second label is different than the first label and is different than the VXLAN identifier for the virtual network.

* * * * *